United States Patent [19]

Sakuta, Jr.

[11] Patent Number: 4,554,757

[45] Date of Patent: Nov. 26, 1985

[54] TROLLING BUCKET

[76] Inventor: Daniel Sakuta, Jr., 560 44th Ave. NE., St. Petersburg, Fla. 33703

[21] Appl. No.: 493,510

[22] Filed: May 11, 1983

[51] Int. Cl.$^4$ .............................................. A01K 97/04
[52] U.S. Cl. ........................................... 43/55; 43/56
[58] Field of Search ............... 43/55, 56, 57; 220/317, 220/318, 322, 323, 94 R, DIG. 14, DIG. 12, DIG. 9

[56] References Cited

U.S. PATENT DOCUMENTS

| | | | |
|---|---|---|---|
| 2,717,469 | 4/1955 | Piker | 43/56 |
| 3,525,429 | 8/1970 | Vaughn | 220/94 R |
| 3,728,812 | 4/1973 | Woolworth | 43/56 |
| 3,960,289 | 6/1976 | Panicci | 220/318 |

Primary Examiner—Nicholas P. Godici
Assistant Examiner—C. McKee
Attorney, Agent, or Firm—Harvey B. Jacobson

[57] ABSTRACT

A bait container is provided in the form of an upwardly opening bucket including a hollow domed cover removably stationarily engagingly supported from and closing the upper end of the bucket. A pivoted bail-type handle is supported from the bucket and swingable between an upstanding position disposed over the upper portion of the domed cover and a generally horizontal position disposed to one side of the cover. The cover is readily removable from the upper end of the bucket when the handle is in the horizontal position and the handle and domed cover include coacting structure for releasably latching the handle in the upstanding position. The handle, when in the upstanding position, serves to latch the cover to the bucket against removal therefrom. One side portion of the domed cover includes an access opening formed therein provided with an openable closure therefor and the interior of the domed cover includes a flotation ring supported therefrom and extending about the access opening. The opposite side of the domed cover includes water ingress openings formed therein.

3 Claims, 6 Drawing Figures

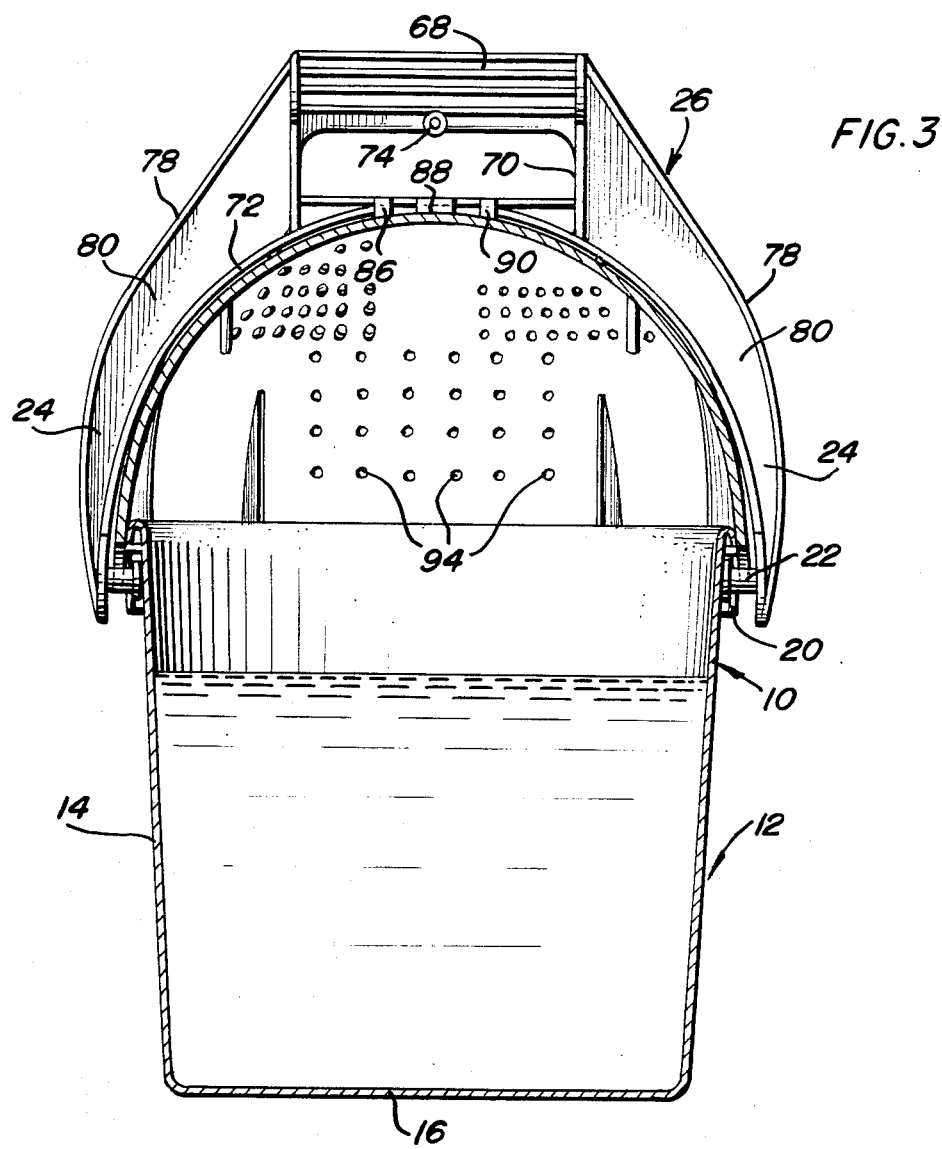
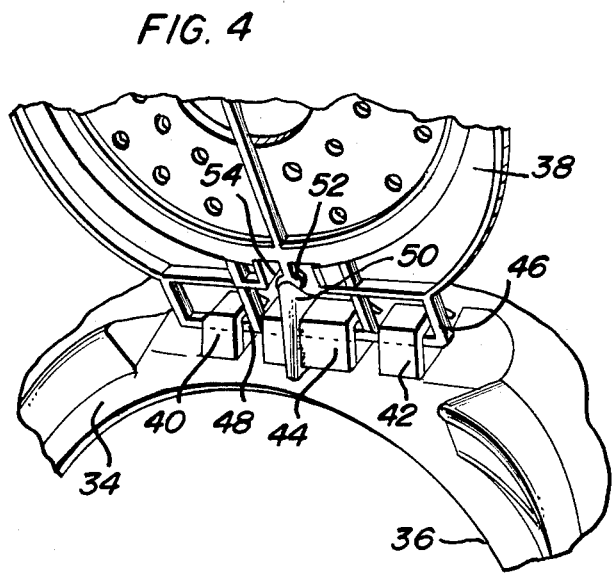
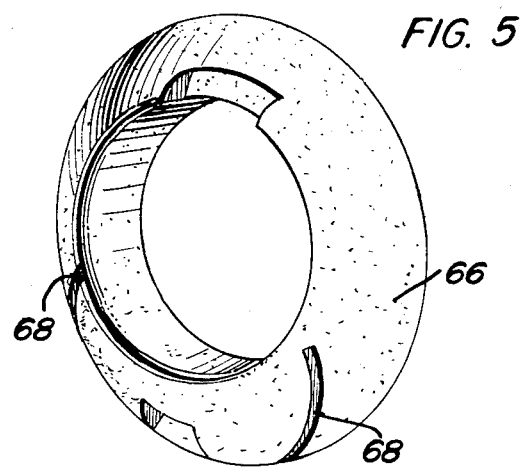

TROLLING BUCKET

BACKGROUND OF THE INVENTION

Live bait containers conventionally used by fishermen consist of a bucket into which water and live bait may be introduced. Some bait containers of this type additionally include small battery powered air compressors whereby compressed air may be pumped through a tube into the bottom of the bucket for aerating the water within the bucket and thus increasing the life expectancy of the live bait while in the bucket. However, small motorized air compressors of this type require a storage battery as a source of electrical power and not all fishing boats are provided with storage batteries such as those used to start inboard or inboard/outboard engines or to power electric trolling motors. In addition, these small battery powered air compressors are subject to frequent failure and cause undesirable drain on the associated storage batteries.

Accordingly, a need exists for a bait container which may be used by fishermen and is constructed in a manner whereby ambient water may be taken into the bait container while the latter is stationary in the water and whereby ambient water may be caused to be admitted into the container by a plurality of jets of water during trolling fishing operations.

Various forms of bait containers including some of the general structural and operational features of the instant invention disclosed in U.S. Pat. Nos. 986,229, 2,834,145, 3,009,281, 3,036,400, 3,304,645, 3,593,453, 3,728,812, 4,019,274, 4,110,931, 4,260,070, 4,297,804 and D 235,205.

BRIEF DESCRIPTION OF THE INVENTION

The bait container of the instant invention is constructed in the form of an upwardly opening bucket provided with a domed cover removably stationarily engagingly supported from and closing the open upper end of the bucket. A pivoted bail-type handle is supported from the bucket and swingable between an upstanding position disposed over the upper portion of the domed cover and a generally horizontal position disposed to one side of the cover. The cover is readily removable when the handle is in the horizontal position and the handle and the cover include coacting structure for releasably latching the handle in the upstanding position. The handle, when in the upstanding position, serves to latch the cover to the bucket against removal therefrom. One side of the upper domed cover includes an access opening formed therein provided with a hinged closure therefor and the other side of the domed cover is provided with water ingress openings. A flotation ring is secured to the inner surface of the domed cover about the access opening and, accordingly, the bucket, when stationary and disposed in the water, is floated in an inclined position with the first-mentioned side of the domed cover facing upwardly. In this position ambient water may readily gain access to the interior of the container through the ingress openings formed in the downwardly facing side of the domed cover. Further, the arms of the bail-type handle comprise water fins and the central portion of the handle is equipped with means by which a tether line may be attached thereto.

When a trolling fishing operation is being carried out the bucket may be trailed behind the fisherman's boat and the water fins on the arms of the handle will maintain the bucket in position with the access opening side of the domed cover facing upwardly and the water ingress opening provided side of the cover facing downwardly. Thus, as the domed cover is advanced against the water jets of water will enter the cover through the water ingress openings formed in the down side thereof. The closure for the access opening includes water outlet openings formed therein and in this manner a plurality of jets of water are introduced into the bait container during trolling operations in order to maintain the water within the bucket highly aerated. When a trolling operation is terminated or temporarily suspended, the container, substantially full of water, will float with the access opening provided side of the cover uppermost and the water ingress opening provided side of the cover facing downwardly. Accordingly, even wave action against the downwardly facing side of the domed cover will cause jets of water to enter the interior of the container and maintain the water therein aerated. Of course, if even a slight breeze exists the bucket will be floated in a downstream position from the boat to which the tether line is attached and water being advanced against the bucket dome by the wind will pass into the container through the water ingress openings with sufficient velocity to cause ample aeration of the water within the container.

The main object of this invention is to provide a live bait container substantially in the form of a conventional bucket and which may be utilized by fishermen during both still fishing and trolling operations to maintain water within the container in an aerated state.

Another object of this invention is to provide a bait container constructed in a manner enabling the container to be floated in a position with the access opening and hinged closure therefor maintained in an upwardly facing position.

Still another object of this invention is to provide a bait container constructed in a manner enabling the container to be trailed behind a boat during trolling operations.

Yet another object of this invention is to provide a bait container consisting of a domed cover and bail-type handle which may be added to existing buckets.

Still another important object of this invention is to provide a bait container which may be conveniently used as a container for aerated live bait water by fishermen even when fishing along the bank of a stream in which the container may be floated.

A final object of this invention to be specifically enumerated herein is to provide a bait container in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a vertical sectional view of the bait container similar to FIG. 2 but taken at right angles to FIG. 2;

FIG. 4 is a fragmentary perspective view of the access opening equipped portion of the domed cover of the container and an adjacent portion of the hinged closure for the access opening;

FIG. 5 is a perspective view of the flotation ring supported within the domed cover of the container about the access opening therein.

DETAILED DESCRIPTION OF THE INVENTION

Figure 1:
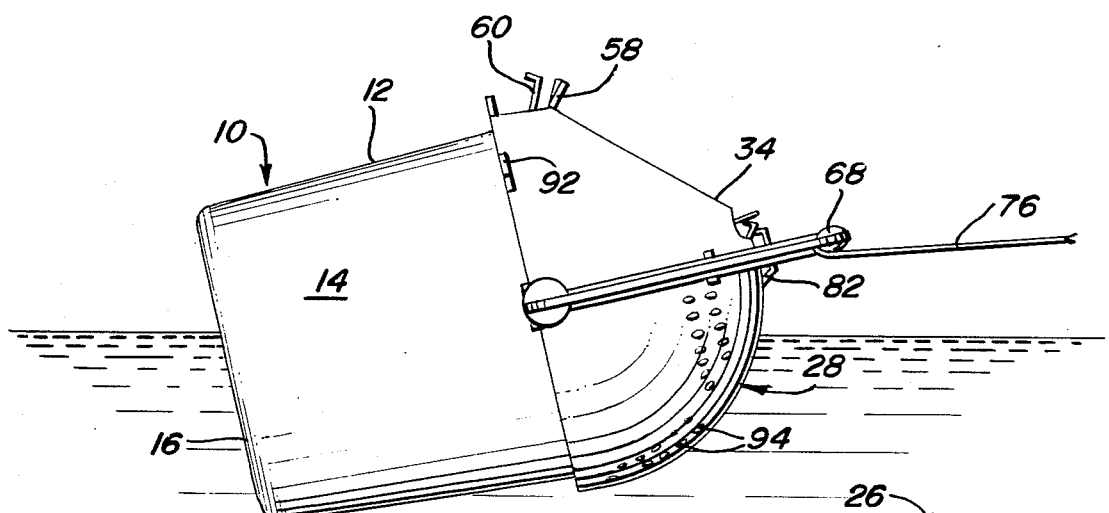
FIG. 1 is a side elevational view of the bait container of the instant invention shown in position being trolled behind a boat, the boat and the forward end portion of the tether line for the bait container being omitted.

Referring now more specifically to the drawings the numeral 10 generally designates the bait container of the instant invention. The bait container comprises a conventional upwardly opening bucket 12 including a slightly downwardly tapering upright cylindrical body 14 closed at its bottom by a bottom wall 16. The upper end of the body 14 includes an out and downturned reinforcing lip 18 and diametrically opposite portions of the downturned lip 18 define downwardly opening slots 20 in which inwardly directed headed shank portions 22 carried by the lower ends of the arms 24 of an inverted U-shaped bail-type handle referred to in general by the reference numeral 26 are removably snap-fittingly and rotatably received. The bucket 12 may be considered of conventional construction and the bail-type handle (only as broadly described above) may also be considered as conventional.

The container 10 further includes a downwardly opening domed cover referred to in general by the reference numeral 28 and the open lower end of the cover 28 includes a circumferentially extending and inwardly projecting integral bead 30 which may be snap-fittingly engaged downwardly over the downturned lip 18 when the cover 28 is removably downwardly telescoped over the upper end of the body 14 of the bucket 12. The interior of the cover 28 includes inwardly projecting stiffening ribs 32 spaced circumferentially thereabout and above the bead 30 and the lower ends of the stiffening ribs 32 downwardly abut the upper end of the body 14 to define a lower limit position of downward telescoping movement of the cover 28 over the upper end of the body 14 of the bucket 12. In the downward limit position of the cover 28 defined by the stiffening ribs 32, the bead 30 is disposed immediately below the down-turned lip 18. Thus, the cover 28 is snap-fittingly, removably and engagingly stationarily supported from the upper end of the body 14 of the bucket 12.

One upper side portion 34 of the cover 28 is flattened and has an access opening 36 formed therein. The access opening is removably closed by a hinged closure 38 which is generally circular in plane shape and of a diameter slightly larger than the circular access opening 36.

The upper marginal portion of the flattened portion 34 includes three horizontally spaced apart and upwardly projecting integral and generally inverted J-shaped hinge barrel defining hooks 40, 42 and 44, see FIG. 4 and the closure 38 is equipped with an integral hinge pin defining U-shaped bail 46 whose bight portion 48 defines a hinge pin removably and snap-fittingly engageable beneath the hooks 40, 42 and 44. The central hook 44 includes an upstanding projecting 50 engageable by a stiff but flexive tongue portion 52 formed integrally with the cover and projecting into an opening 54 formed in the cover adjacent the bail 46. The hooks 40, 42 and 44 and the hinge pin portion 48 of the bail 46 serve to hingedly support the closure 38 from the cover 28 for swinging movement between a position closely overlying and closing the opening 36 and a raised position such as that illustrated in phantom line in FIG. 2 with the tongue portion 52 disposed behind and above the projecting 50 to releasably maintain the closure 38 in the open position.

The portion of the flat portion 34 disposed outward of the lower marginal edge of the opening 36 has an opening 56 formed therein and the free swinging edge of the closure 38 includes an upstanding substantially non-yieldable finger tab portion 58 and a U-shaped thumb-engageable tab portion 60 which is stiff but somewhat flexible and includes a detent 62 engageable beneath the lower edge of the opening 56 to releasably retain the closure 38 in the closed position. In order to open the closure 38, the tab portions 58 and 60 are engaged between the forefinger and thumb of the user's hand and the tab portion 60 is displaced toward the tab portion 58 in order to inwardly displace the detent 62 from behind the lower marginal edge of the portion 34 defining the opening 56.

An annular flotation member 66 is disposed immediately inwardly of the flat portion 34 and includes peripherally spaced slots 68 formed therein in which stiffening ribs on opposite sides of the flat portion 34 are engaged to maintain the flotation member 66 in position beneath the flat portion 34.

The handle 36 includes a handgrip defining portion 68 immediately beneath which an access opening 70 is formed and an inner peripheral flange 72 of the handle 26 extends immediately beneath the opening 70. In addition, the handgrip 68 includes a lower aperture 74 formed therethrough whereby the trailing end of a tether line 76 may be passed and knotted through the aperture 74 in order to anchor the container 10 to the tether line 76.

Figure 6:
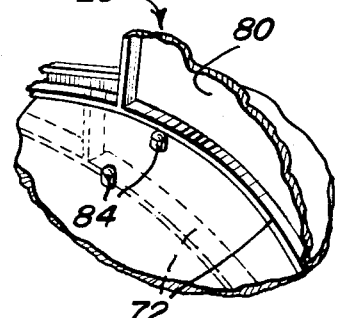
FIG. 6 is a fragmentary perspective view of the upper portion of the domed cover with an adjacent portion of the bail-type handle immediately prior to full positioning of the bail-type handle in the upright position thereof.
Figure 2:
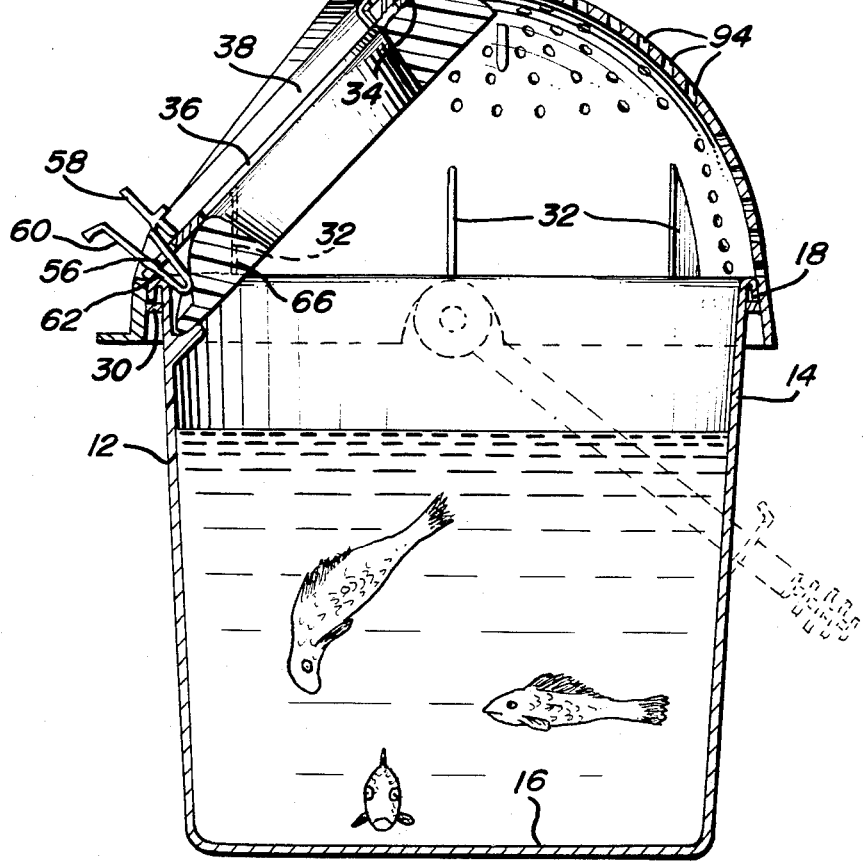
FIG. 2 is an enlarged vertical sectional view taken substantially upon a plane passing through the center line of the bait container and with an alternate open position of the closure for the access opening of the domed top of the container being illustrated in phantom lines.

From FIG. 3 of the drawings it may be seen that the arms 24 of the handle 26 include outer peripheral flange 78 and fin portions 80 disposed between flange 72 and flange 78 for a purpose to be hereinafter more fully set forth and from FIG. 2 of the drawings it may be seen that the upper central portion of the cover 28 includes a bevelled lug 82. From FIG. 1 it may be seen that inner flange 72 is wider than outer flange 78. Further, from FIG. 6 of the drawings it may be seen that opposite side portions of the cover 28 include spaced upwardly projecting lugs 84. Also, from a comparison of FIGS. 2 and 3 it will be noted that one side of the upper portion of the flange 72 includes three downwardly projecting integral tabs 86, 88 and 90.

As the handle 26 is swung upwardly from a horizontal position toward the lug 82 and an upstanding position, the center tab 88 engages the rides up over the lug 82. In this position, with the tab 88 disposed immediately past the lug 82, the handle 26 is initially latched in a first upright position from which the handle 26 may be readily releasably unlatched merely by twisting the upper portion of the handle 26 to again retract the tab 88 rearwardly over the lug 82. However, upon continued movement of the handle 26 to its full upright position, the leading edge of the flange 72 rides over the first pair of lugs or projections 84 and is received between the two pairs of lugs 84. In this manner, the handle 26 is more securely locked in an upstanding position. Also, when the flange 72 is received between the pairs of lugs 84, the tabs 86, 88 and 90 are positioned to prevent the hooks 40, 44 and 42 from being opened.

If the container 10 is to be used by fishermen operating a boat provided with a storage battery and the fishermen wish to dock or otherwise suspend fishing operations for extended periods of time, the container 10 may be retrieved from the water and placed within the boat. Thereafter, a battery powered aerator may be suspended from the integral U-shaped holder 92 carried by one lower peripheral portion of the domed cover 28. Otherwise, the container 10 is fully operative to maintain the water therein aerated for extending the life expectancy of live bait within the bucket 12.

In operation, the closure 38 may be opened and live bait may be placed within the bucket 12. Thereafter, the closure is swung to the closed position and latched in the closed position. The tether line 76 is anchored to the handle 26 and the bucket 12 may be placed in the water. The flotation member 66 will cause the container 10 float in the water with the water level generally parallelling and spaced only slightly below the flat portion 34. In this manner, and particularly if there is a breeze whereby the bucket 12 will move to a down wind position from the associated boat, wave and ripple action of water against the side of the cover 28 remote from the flat portion 34 and having water entrance bores 94 formed therein will cause little spurts or jets of water to enter the cover 28 through the opening 94. These spurts or jets of water will of course cause the water within the container 10 to be aerated. If the boat being used by the fishermen is to be used for trolling operations, it is merely necessary to move the boat away at trolling speeds. The container 10 will then be trailed behind the boat in the approximate position illustrated in FIG. 1 with the curved surface of the cover and the inclined lower side of the bucket 12 serving to slightly raise the level of the container 10 while numerous jets of water enter the container 10 through the bores 94. The bores 94 generally parallel the longitudinal center axis of the bucket and the fins 80 maintain the container 10 against roll movements and thereby assure that the bores or openings 94 will be disposed lowermost when the container 10 is being trailed behind a boat. Thus, it may be seen that the container 10 is operative to maintain the water therein in an aerated condition during boat fishing operations. Also, container 10 may be tethered to a tree limb or other stationary object and placed within a running stream or river. In this manner, the current flow of the water in the stream or river will maintain the water within the container 10 aerated.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A bait container including an upwardly opening bucket, a domed cover removably engagingly stationarily supported from and closing the open upper end of said bucket, a pivoted bail-type handle supported from said bucket and swingable between an upstanding position over the upper portion of said domed cover and a generally horizontal position disposed to one side of said cover, said cover being readily removable when said handle is in said horizontal position, said handle and cover including coacting means for releasably latching said handle in said upstanding position, said handle, when in said upstanding position, serving to latch said cover to said bucket against removal therefrom, an upper portion of the side opposite said one side of said domed cover including an access opening formed therein, closure means shiftably supported from said domed cover and movable into and out of position closing said access opening, said one side of said domed cover including water ingress openings formed therein, said bail-type handle including a pair of remote arm end portions pivotally supported from opposite sides of said bucket, the arms of said handle comprising solid web-like portions defining water fin means substantially coincident with the medial plane of said handle, said handle including a central portion defining anchor structure to which one end of a tether line may be releasably anchored; said web like portions extending from either side of said anchor structure substantially to the outer surface of said domed cover in an uninterupted manner, and tapering toward said opposite sides of said bucket so as to establish an effective hydrofoil surface for trolling when in said upstanding position.

2. The bait container of claim 1 wherein the inner side of said side opposite said one side of said cover includes flotation means for floating said bucket in a body of water with said opening facing substantially vertically upwardly.

3. The trolling bucket of claim 2 wherein said flotation means comprises an annular flotation member secured to the underside of said domed cover about said access opening.

* * * * *